April 9, 1963 — W. P. LORIS — 3,085,127
BATTERY RETAINER
Filed Sept. 25, 1959
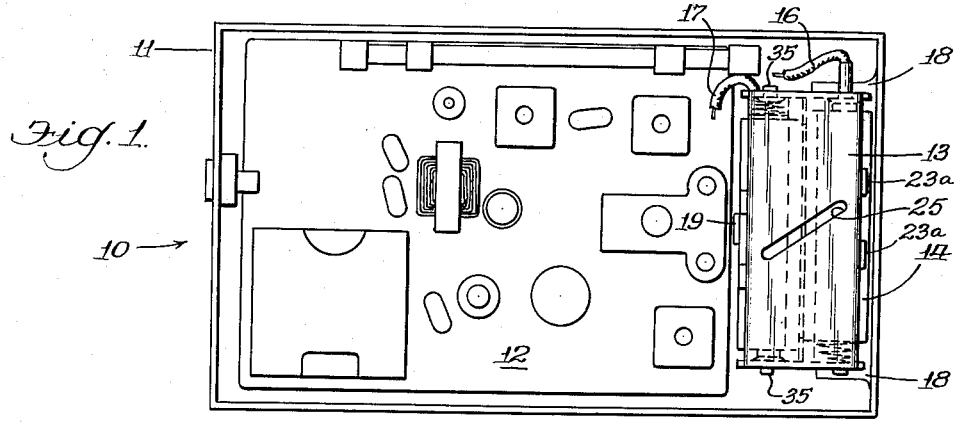
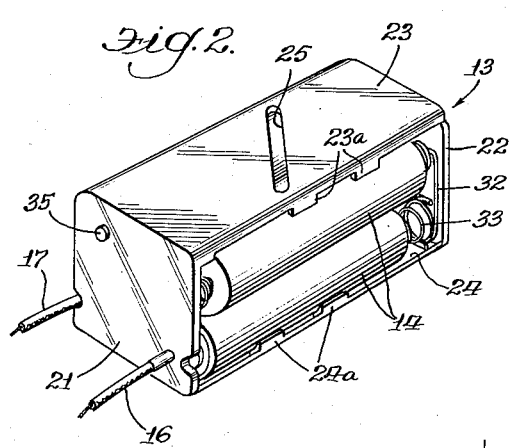
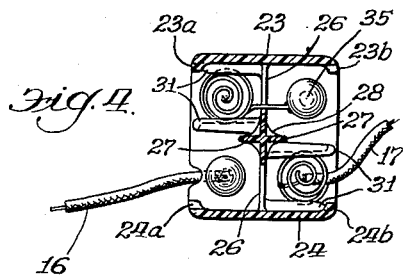
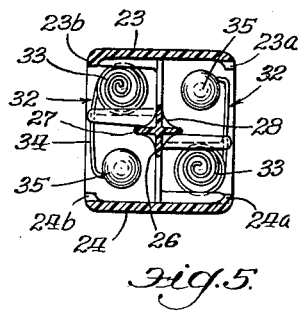
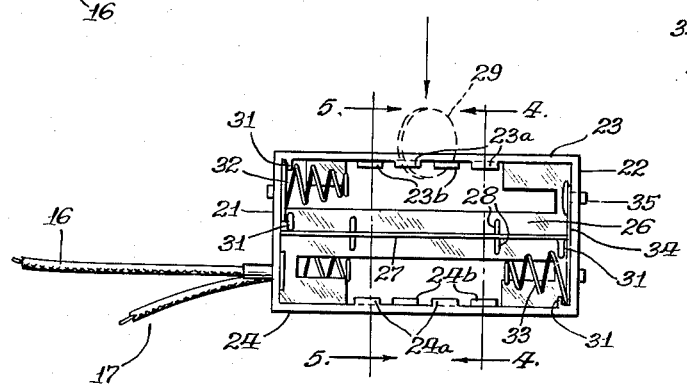
INVENTOR.
William P. Loris
BY Mueller & Aichele
Attys

United States Patent Office

3,085,127
Patented Apr. 9, 1963

3,085,127
BATTERY RETAINER
William P. Loris, Niles, Ill., assignor to Motorola, Inc., Chicago, Ill., a corporation of Illinois
Filed Sept. 25, 1959, Ser. No. 842,329
4 Claims. (Cl. 136—173)

This invention relates generally to containers or housings for holding a plurality of batteries and more particularly to a multi-cell battery retainer for portable radios.

A well-known achievement in recent years in the portable radio art has been the reduction in size and weight of portable radios. One of the problems resulting from this trend to miniaturization of portable radios has been the disposition of the power supply batteries. Transistorized circuitry has made it possible to use small batteries such as the one and one half volt penlight type battery cells for powering portable radio receivers. However, it is often necessary to utilize a plurality of such batteries in series connection to achieve the desired operating voltages. Some compact means must be provided, therefore, to retain a grouping of cells in an electrically connected relationship within the limited space available in a portable radio cabinet, and preferably in some readily acessible manner so they may be easily replaced as they wear out.

In the prior art several types of retainers, housings, boxes, etc., have been provided for holding portable radio batteries within the radio cabinet. One such battery box comprises a one piece plastic tray in which four pen-light batteries may be carried in pairs arranged end to end. Although this type of battery box is suitable for some portable radios, the end to end arrangement is too long for the smaller transistor radio receivers. Although the battery box may be eliminated and the cells merely laid on top of one another this has the disadvantage that the batteries are not removable as a unit and the individual batteries are not as securely retained nor as easily accessible.

Accordingly, it is an object of the present invention to provide a simple battery retainer which will securely hold a plurality of batteries in a compact arrangement.

Another object is to provide a retainer for a plurality of batteries in which each battery may be individually inserted and removed with a minimum of effort.

Still another object of the invention is to provide a battery retainer which may be inexpensively molded as a strong integral unit having no movable portions.

A further object is to provide a battery retainer wherein the individual batteries are separated from one another, and which insulates the batteries and their electrical interconnections from the radio cabinet and components.

A still further object is to provide a battery retainer for a portable radio which will retain the batteries in secure electrical connection despite the jarring and vibration to which portable radios are commonly subjected.

A feature of the present invention is the provision of a battery retainer molded in one piece from plastic material with a separate compartment for each battery cell and in which each compartment is separately accessible for removing individual cells.

Another feature is the provision of a battery retainer having individual compartments for the batteries with a diagonal slot in opposite side panels of the retainer case adapted to receive a coin or other object as a wedging tool for freeing individual batteries from the retainer.

A further feature of the invention is the provision of a compartmented battery retainer adapter to carry at one end of each compartment a combination terminal piece composed of spring and flat portions, with the spring portions of the terminal pieces at one end of the retainer urging the batteries into vibration-proof electrical contact against the flat portions of opposite terminal pieces. The ends of each battery compartment are provided with recesses for readily receiving the combination spring and flat contact terminal pieces, and the terminal pieces provide internal electrical connections which are insulated by the retainer.

In the accompanying drawing:

FIG. 1 is a side elevational view of the back of a small portable radio receiver with its rear cover removed to show the battery retainer constructed in accordance with the invention;

FIG. 2 is a perspective view of the battery retainer with battery cells mounted therein;

FIG. 3 is an elevational view looking through the open sides of the battery retainer with all the batteries removed;

FIG. 4 is an elevational view taken in section on the line 4—4 of FIG. 3; and

FIG. 5 is an elevational view taken in section on the line 5—5 of FIG. 3.

A battery retainer constructed in accordance with the invention provides an integral container for holding together a plurality of battery dry cells in a compact electrically interconnected unit. A pair of opposite end panels are joined by a pair of opposite side panels to form a box with opposite open sides. An internal retaining member is disposed in a longitudinal plane which bisects the side panels, and this member in turn is bisected by an integral longitudinal rib member so that together they form a strong center beam dividing the container into four compartments. Lug portions may be provided along the edges of the side panels to assist in retaining the batteries, and each side panel has a diagonal slot so that the batteries may be pried loose from their respective compartments by inserting a coin into the slot. The opposite ends of each compartment may be provided respectively with a pair of transversely disposed grooves and a terminal post hole adapted to readily receive a combination spring and flat terminal piece for electrically interconnecting adjacent battery compartments.

FIG. 1 of the drawing is a view from the rear of a portable radio receiver 10 with the back cover removed from the cabinet 11 to show the location of a few of the component parts contained in the receiver. These include a chassis 12 carrying a variety of parts in very close juxtaposition, and a battery retainer 13 constructed in accordance with the invention and mounted snugly against the right side of the cabinet 11. Battery retainer 13 contains four, one and one-half volt penlight-type dry cells 14 connected in series to provide a six volt power supply for the receiver. Power connections are made to the receiver chassis by means of a positive lead 16 and a negative or ground lead 17 which extend from one end of the retainer 13. The retainer is held against longitudinal motion by a pair of lugs 18 extending from the radio cabinet 11. Another lug 19 holds the retainer against the right side of the cabinet, while the back cover of the cabinet (not shown) bears against the battery retainer to keep it in place when the cover is secured on the receiver cabinet. Thus, when the batteries become run down and replacement is necessary, it is an easy matter to remove the entire assembly of the four dry cells by merely sliding the retainer 13 out from between the lugs 18 and 19 of the receiver cabinet.

The battery retainer 13 is shown removed from the receiver in FIG. 2. It is generally rectangular with a pair of parallel, substantially square end panels 21 and 22 spaced longitudinally apart by a pair of oppositely disposed parallel side panels 23 and 24. The remaining two sides are left open so that all of the four dry cells are individually accessible. A diagonally disposed slot 25 is provided at about the centers of sides 23 and 24. The four dry cells are compactly nested in bundle fashion within the retainer 13 between positive and negative terminals, to be subsequently described.

As may be seen in FIG. 3, each longitudinal edge of the sides 23 and 24 has a pair of spaced retaining lugs 23a, 23b, 24a, and 24b respectively to aid in retaining each cell within its respective compartment. The pairs of lugs 23a and 24a are staggered longitudinally with respect to lug pairs 23b and 24b so that none of the lugs overlap each other in a direction parallel to both the end and side panels. This relationship of the lugs contributes to the ease of molding the battery retainer in a two-piece mold. The longitudinal location of the lugs also corresponds to the manner in which the battery cells are staggered between alternated positive and negative terminals in providing a series interconnection. These lugs are integrally formed to project at right angles from their respective sides a distance sufficient to retain a battery cell while still permitting the cell to be inserted sideways into each compartment.

FIG. 3 also illustrates the construction of the internal portions of retainer 13. A vertical wall section 26 is disposed in a longitudinal plane which bisects the side and end panels so as to divide the retainer in half. The wall 26 in turn is bisected on both sides by longitudinal extending ribs 27 integral therewith, more clearly seen in the sectional views of FIGS. 4 and 5. A longitudinal center beam is thus formed, dividing the retainer 13 longitudinally into quarters so that four compartments are provided of a suitable size to each receive a dry cell with a close fit. The ribs 27 extend at right angles from the plane of the wall 26 a distance sufficient to provide a retaining shelf for each dry cell received on either side of the rib, but not too far to prohibit passage of the dry cell between its outer edge and the pair of retaining lugs provided for that compartment. As best seen in FIG. 3, the portions of wall section 26 on each side of ribs 27 may be shaped generally in the form of a C. The portions of wall section 26 adjacent ribs 27 extend therefrom roughly the same distance which each rib extends from wall section 26, and the portions of wall section 26 adjacent side panels 23 and 24 terminate short of the central slotted areas of the side panels. Thus an open area is provided in wall section 26 to permit a coin 29 to be inserted through slots 25 in side panels 23 and 24. The C shaped wall also receives a portion of the cylindrical periphery of the battery cells for more compact nesting thereof in the battery retainer. Integral stiffening ribs or fillets 28 also are spaced along the intersection of wall 26 with rib 27 for added strength and to cradle the periphery of the dry cell in each compartment.

From the structure described thus far, it is to be understood that the batteries are easily insertable into their respective compartments, but once inserted they are securely retained. When it is desired to remove one or more of the batteries, it is only necessary to insert a coin 29 or other flat object of suitable size into the appropriate slots 25. Since the slots are diagonally disposed a wedging action is obtainable between the coin and the dry cells to pry the cells loose. The cylindrical shape of the cells also cooperates with the slots, for when the coin is pushed downward in the direction of the arrow it enters the crevice between adjacent cells and easily spreads the cells apart. Thus a convenient means is provided for removing the dry cells since a coin is the only tool needed.

The four dry cells are electrically interconnected to form a power supply and to this end further integral portions are provided in the compartments for receiving metallic terminal pieces. At one end of each compartment a pair of transversely extending arm portions 31 are provided which are spaced a slight distance from, and parallel to, the end portions 21 and 22. These arm portions are shaped like an angle piece with the horizontal portion thereof being integral with the end walls 21 and 22 and slightly shorter than the vertical portion of the arm. Together the arm portions and the end wall form a pair of transversely extending grooves accessible from the open sides of the battery retainer.

A combined positive and negative terminal piece 32 is received in each pair of grooves to electrically connect the negative end of one battery and the positive end of another battery. With the exception of the terminals for the power leads 16 and 17, each of the terminal pieces 32 is of the same one piece construction. As most clearly shown in FIG. 5, the terminal pieces 32 consist of a cone shaped helical spring 33 with the base turn thereof straightened out into a tangentially extending portion 34 which is soldered to a rivet-like flat portion 35. The batteries may be alternately reversed to provide a series connection, and in such an arrangement the flat negative ends of the cells bear against the spring portions 33 of the combination terminal pieces 32 while the raised positive terminals of the battery cells bear against the flat contact terminals 35 (FIGS. 1 and 2).

The terminal pieces 32 are easily placed into three of the four compartments of the retainer. The base turn of the spring portion 33 is slid into the grooves provided by the arm portions 31 until it is fully inserted therein, and then the flat portion 35 is pivoted into the adjacent compartment and sprung into place so that the rivet bushing portion of the flat portion 35 extends through a hole provided therefor in the end portions 21 and 22. The terminal piece 32 is thus securely locked in place due to the snug fit of the spring portion 33 in the grooves and, with respect to the terminal pieces 32 on the inside of end panel 22 (FIG. 5), because the straight portion 34 is hooked under tension around the outer end of arm 31. The terminal piece 32 on the inside of end panel 21 (FIG. 4) is also sprung into place, but its straight portion 34 is hooked under tension over wall section 26. Of course, after the batteries have been mounted in their respective compartments, the terminal pieces will be compressed so that there is no danger of the pieces coming loose.

Thus, all electrical connections between the battery cell are made internally in the battery retainer by these easily assembled one-piece terminal pairs. The spring terminal connected to the negative lead 17 and the flat terminal connected to the positive lead 16 are provided as separate pieces because it is more convenient to assemble the leads to these pieces prior to their insertion in the battery box.

Battery retainer 13 is preferably constructed of plastic material, such as naylon or any rigid polyethylene material which is easily molded and is an insulator. The cellular construction of the battery box when made of this material serves to insulate each cell from the adjacent cell as well as from the other components in the radio receiver.

I claim:
1. A battery retainer for holding a plurality of battery cells in assembled relation including in combination, an open sided container having a pair of oppositely disposed end panels and a pair of oppositely disposed side panels which connect said end panels, longitudinally extending means within said container and dividing said container into a plurality of individual battery cell compartments, means forming a pair of grooves near one end of each compartment, a terminal piece having a helical spring portion forming a negative terminal with a portion of the base turn thereof extending tangentially therefrom and being connected to a rivet-like flat portion forming a positive terminal, said base turn of said spring portion of said terminal piece being received and retained in said pair of grooves in one of said compartments and said flat portion being received in an adjacent compartment to thereby electrically interconnect said compartments, means on said end panels engaging said tangentially extending portion for flexing the same so that said terminal piece is securely held in place, whereby a pair of battery cells may be separately inserted through the open sides of said container and received in said one and adjacent compartments with adjacent end terminals of the cells against said spring portion and said flat portion and retained securely between said longitudinally extending means and said side panels in series connected relationship.

2. A battery retainer for holding a plurality of battery cells in assembled relation including in combination, an open sided container having a pair of oppositely disposed end panels and a pair of oppositely disposed side panels which connect said end panels, longitudinally extending means within said container and dividing said container into a plurality of individual battery cell compartments, means forming a pair of grooves near one end of each compartment, a plurality of terminal pieces each having a helical spring portion forming a negative terminal with a portion of the base turn thereof extending tangentially therefrom and being connected to a flat portion having a projection extending therefrom and forming a positive terminal, said terminal pieces each being secured by said base turn of said spring portion of said terminal piece being received and retained in said pair of grooves in one of said compartments and said projection of said flat portion being received in an end panel hole located longitudinally opposite the pair of grooves in an adjacent compartment to thereby electrically interconnect said compartments, whereby battery cells may be separately inserted through the open sides of said container and received between said spring portions and the longitudinally oposite flat portions and retained securely between said longitudinally extending means and said side panels in series connected relationship, said side panels each having a slot therein whereby battery cells in said compartments may be freed from said container by inserting an object through said slots.

3. A plastic battery box for holding an assembly of four battery cells for use in a portable radio receiver including in combination, an open sided one piece container having a pair of parallel spaced apart end portions and a pair of parallel side panel portions which connect said end portions, a center wall portion extending longitudinally between said end portions in a plane perpendicular to and bisecting said side panel portions with an open area therein adjacent each of said side panels, a longitudinal rib portion bisecting said center wall portion for separating said container into four compartments adapted to support battery cells received in the container, each of said side panel portions having a pair of lug portions along each longitudinal edge thereof projecting into the open sides of said container so that the ends of said lug portions are spaced from the outer edges of said rib portion for retaining the battery cells in said container, with the pair of lug portions along one edge of a side panel portion being longitudinally staggered with respect to the pair of lug portions along the other edge of said side panel portion, a plurality of terminal pieces including three integral terminal pieces each having a helical spring portion with a portion of the base turn thereof extending tangentially therefrom and being connected to a rivetlike flat portion, said end portions of said container having diagonally staggered means on the inner side thereof forming a pair of grooves near one end of each compartment adapted to receive and retain said base turn of said spring portions of said terminal pieces, said flat portions being received in an adjacent compartment at the end thereof opposite the pair of grooves therein to thereby secure said terminal pieces in place and to electrically connect adjacent compartments, each battery cell being separately insertable through the open sides of said battery retainer and received between said terminal pieces and retained by said lug portions and said center column, said side panel portions each having a diagonal slot therein whereby battery cells in the container may be freed therefrom through both open sides thereof by inserting an object through said slots and into engagement with the battery cells.

4. A plastic battery box for holding an assembly of four battery cells for use in a portable radio receiver, said battery box being molded as a single integral unit and including in combination an open sided one piece container having a pair of parallel spaced apart end portions and a pair of parallel side panel portions which connect said end portions, a center wall portion extending longitudinally between said end portions in a plane perpendicular to and bisecting said side panel portions with an open area therein adjacent each of said side panels, a longitudinal rib portion on each side of and bisecting said center wall portion for separating said container into four compartments each adapted to support a battery cell received in the container, each of said side panel portions having a pair of lug portions along each longitudinal edge thereof projecting into the open sides of said container so that the ends of said lug portions are spaced from the outer edges of said rib portions for retaining the battery cells in said compartments, with the pair of lug portions along one edge of a side panel portion being longitudinally staggered with respect to the pair of lug portions along the other edge of said side panel portion, said end portions having means for receiving terminal pieces for engaging battery cells in said compartments, each of said compartments being adapted to receive a separate battery cell through the open sides of said battery retainer and between the terminal pieces with said lug portions and said rib portions retaining the cell therein, each of said side panel portions having a diagonal slot therein for receiving an object therein for engagement with the pair of battery cells in the container adjacent to the said side panel portion, whereby the cells may be freed through both open sides of the container in response to pressure of the object on the battery cells.

References Cited in the file of this patent

UNITED STATES PATENTS

| | | |
|---|---|---|
| 1,316,568 | Fertman et al. | Sept. 23, 1919 |
| 1,487,428 | Balderston | Mar. 18, 1924 |
| 1,627,264 | Baird | May 3, 1927 |
| 2,117,692 | Atkins | May 17, 1938 |
| 2,176,671 | Huth | Oct. 17, 1939 |
| 2,383,337 | Moxley | Aug. 21, 1945 |
| 2,590,804 | Vitale | Mar. 25, 1952 |
| 2,818,463 | Parker | Dec. 31, 1957 |

FOREIGN PATENTS

| | | |
|---|---|---|
| 377,925 | Germany | June 29, 1923 |